Reissued Apr. 14, 1942

Re. 22,073

UNITED STATES PATENT OFFICE 22,073

HARD METAL TOOL ALLOY

Paul Schwarzkopf, Yonkers, N. Y., assignor to American Cutting Alloys, Inc., New York, N. Y., a corporation of Delaware No Drawing. Original No. 2,170,432, dated August 22, 1939, Serial No. 155,919, July 27, 1937. Reissue No. 21,730, dated February 25, 1941, Serial No. 351,638, August 6, 1940. This application for reissue August 19, 1941, Serial No. 407,505. In Germany May 16, 1929

11 Claims. (Cl. 75—136)

This invention refers to a hard metal tool alloy.

This invention forms a continuation in part of my copending application Ser. #727,781, filed May 26, 1934, and of my copending application Ser. #743,717, filed September 12, 1934, and issued into Patent #2,122,157, which were in turn copending with my application Ser. #656,103, filed February 10, 1933, and issued into Patent #1,959,879, and my application Ser. #625,042, filed July 27, 1932, and issued into Patent No. 2,091,017, which were in turn copending with my application Ser. #452,132, filed May 13, 1930 and I of course do not claim herein anything which is subject matter of the claims in my above mentioned earlier patents.

It is an object of the invention to increase the hardness of such hard metal tool alloys without impairing their toughness.

It is another object of the invention to increase the resistance of such hard metal tool alloys against mechanical wear and chemical effects such as of the oxygen of the surrounding air, or moisture, or a cooling liquid such as water.

It is another object of the invention to adjust the heat conductivity of the hard metal tool alloy without impairing its hardness or resistance against oxidation.

It is still another object of the invention to increase the speed at which hard alloys of this kind can be used for cutting, drilling, milling, and other machining purposes of material which, as e. g. steel form long chips.

This and other objects of the invention will be more clearly understood when the specification proceeds.

Hard metal tool alloys of the type referred to have been made of tungsten carbide and auxiliary metal taken substantially from the iron group, in amounts from about 3 to 20%. The tungsten carbide has been finely powdered and mixed with the auxiliary metal, and the mixture heated to sintering temperature. Such hard metal tool alloys could be utilized for machining cast iron but do not prove efficient in high speed machining of steel and other compositions of metal.

In contradistinction hereto the invention proceeds from fundamentally new considerations. It no longer uses one carbide alone, viz. tungsten carbide, and cements it by auxiliary metal in the heat.

The present invention particularly refers to a tool alloy comprising a consolidated product containing cementing auxiliary metal amounting to about 3 to 22% of one or more metals of the group comprising nickel, cobalt and iron and two carbides for instance of tungsten, (i. e. an element of the sixth group of the periodic system), boron (i. e. an element of the third group of the periodic system), titanium, (i. e. an element of the fourth group of the periodic system), and vanadium (i. e. an element of the fifth group of the periodic system) which are substantially or entirely compounded by heating to a sufficient extent into crystalline solid solutions or homogeneous carbide crystal structures each of which contains atoms of two different selected elements capable to form such structures besides, of course, atoms of carbon required to form carbide with those selected elements. Such carbide solutions exhibit properties which are very desirable particularly in tool materials.

Experiments have shown and science has given the rule that the hardness of solid solutions of elements exceeds that of the solvent element and is a function of their proportion, and that this function possesses a maximum. Plotting in a graph the hardness of the solid solution of two metals against their concentration in solid solution, it generally appears that the hardness increases with the concentration to a flat maximum of the hardness-composition-graph, and if the solid solubility is in excess of the equi-atomic ratio of the component metals, the flat maximum occurs within a range of 5% to 10% on either side of this ratio. (Kurnakow and Zemczuzny, "Zeitschrift für anorganische Chemie" 1908, volume 60, page 1, and 1910 volume 68, page 123; the standard textbook of Reinglass "Chemische Technologie der Legierungen," second edition, pages 52, 53; Jeffries and Archer, "The Science of Metals," 1924, pages 254 ff.; and M. v. Schwarz, "Metall- und Legierungskunde," second edition (1929), page 49).

It is particularly advantageous to choose for use in the present invention carbides which form the above defined homogeneous carbide crystal structures, and to choose the range of their composition so that structures exhibiting approximately maximum hardness will be produced which increase correspondingly the overall or average hardness of the composition containing those structures.

For illustration of the analogous application to carbide crystal substances of the above rules pertaining to approximately greatest hardness of solid solutions of two elements or metal substances let me take an alloy comprising 10% auxiliary metal and therefore 90% carbide substance. Let me further assume that tungsten-carbide and titanium-carbide are to be compounded to form the theoretically hardest solid solution. Then we have to divide these 90% in the equi-molecular ratio of 60:196 of the component carbide compounds TiC and WC (which corresponds to the equi-atomic ratio of the elements in solid solution), and we have to take about 20% (by weight) titanium-carbide, about 70% tungsten-carbide and about 10% auxiliary metal.

In the above example, 10% auxiliary metal are chosen only for sake of simplicity. But the amount of auxiliary metal taken essentially, i. e. completely or almost completely, of the iron group may vary between 3% and 22%. The amount may be smaller if heavy mixtures of carbides are concerned and larger if lighter mixtures of carbides (e. g. with titanium-carbide) are concerned.

Other compositions the overall or average hardness of which is increased by compounding the carbides substantially or entirely into solid solutions are for instance the following: 50% to 70% titanium-carbide, 40 to 20% vanadium-carbide, 5 to 20% auxiliary metal; 30 to 50% titanium-carbide, 60 to 40% boron-carbide, 5 to 20% auxiliary metal; 15 to 25% titanium-carbide, 75 to 55% tungsten-carbide, 5 to 20% auxiliary metal.

Such solid solutions are cemented by auxiliary metals such as nickel, cobalt and iron singly or in suitable mixtures. It is believed that the auxiliary metal acts as a sintering-aid during sintering and as a metal cement in the completed body. The fine grain imparted to the powdered carbide and their as uniform as possible distribution is substantially maintained and a desirable toughness and density of the alloy or tool obtained. It has been found that solid solutions or homogeneous carbide crystal structures, as defined hereinbefore, resist recrystallization to a large extent. Also according to the theory applying to solid solutions, in a solid solution of substances of different resistance against corrosion the substance of greater resistance protects that of lower resistance (Jeffries and Archer, ibid., page 261), and the heat conductivity of one substance to which another is added in solid solution is considerably lowered (Jeffries and Archer, ibid., pp. 246, 247 and Hume-Rothery, "The Metallic State," pp. 85 to 87).

For special purposes, e. g. for finest cuts or polishing, mixtures of titanium-carbide and molybdenum-carbide in about equal proportions forming substantially homogeneous carbide crystal structures or solid solutions and nickel up to 9% and 15% and chromium up to 1 and 2% as auxiliary metals has been proved advantageous.

But I have established good results also by forming substantially solid solutions of about 30 to 15% molybdenum-carbide ($Mo_2C$), of the sixth group, and about 65 to 70% titanium-carbide (TiC) of the fourth group, adding hereto as auxiliary metals 8 to 15% nickel and 0 to 2% chromium. Within this range the optimum e. g. for high speed work appeared to be at about 8 to 10% nickel and up to 1 to 2% chromium.

According to this part of my invention compositions are usable which comprise substantial amounts of solid solutions or homogeneous carbide crystal structures formed by heat treatment to sufficient extent, of one element of the sixth group of the periodic system and one element of the fourth group of the periodic system in the presence of carbon required to form carbide therewith, and cemented by one or more auxiliary metals essentially, i. e. completely or almost completely of the iron group.

Hard metals of the above compositions particularly exhibit high resistance against oxidation at elevated temperatures, great hardness and relatively small specific weight.

Any suitable known method may be used for the production of the solid solutions. The carbides can be suitably comminuted, mixed and heated up to about 1600° to about 2000° C. for about 1 to 2 hours until homogeneous carbide crystal structures or solid solutions are preformed in substantial amount. Then the selected auxiliary metal or metals are to be added in the desired quantity, the whole is to be intimately mixed and then to be sintered at a temperature of about 1400° to about 1600° C. If the preformed carbide crystals are too coarse, then they are suitably pulverized and mixed with the auxiliary metal and then sintered. Before or while sintering, the molding of the powder so obtained takes place, preferably under pressure of several atmospheres per square centimeter, up to e. g. 50 and 75 atmospheres and higher. It is also possible to mix oxides of the selected elements, in finely divided form with additions of suitably pulverized carbon and to heat the mixture to a sufficient extent in an electric furnace, whereby solid solutions of the carbides concerned in substatnial amounts are preformed.

But my invention is not limited to any special process of producing carbides, and compounding them substantially or entirely into homogeneous carbide crystal structures or solid solutions.

In particular the tool or hard metal composition according to my invention may be produced by mixing the carbides and auxiliary metal which are to be contained in the tool alloy, in as finely divided a form as commercially possible, shaping and pressing the mixture, if desired, and thereupon sintering it until at least substantial amounts of homogeneous carbide crystal structures are obtained each of which contains atoms of two different selected elements capable of forming such structures in addition to atoms of carbon required to form carbide with those elements. Moreover, the elements or even their oxides, selected to form the desired carbide compounds may be admixed, on one hand, with carbon in sufficient amount so as to carbidize the elements or oxides, and, on the other hand, with the selected auxiliary metal, and the mixture preferably powdered as finely as possible, heated to sintering temperature for a sufficient period of time so that a tough and hard composition results containing the desired compounds, including at least substantial amounts of solid solutions or homogeneous carbide crystal structures as defined above, cemented by the auxiliary metal.

Sintering may be preformed e. g. by electrical induction heating, if desired, in vacuo.

An electric furnace can be employed for effecting the heating and sintering; the sintering may also be carried out by means of high frequency currents. In some cases particularly good results are obtained by carrying out the heating or sintering in a vacuum.

Electrical heating current may also be led through the body itself or around the body through the mould.

The temperature of the body is to be elevated to about 1400 to about 1600° C. and this heat-treatment to be continued for about one or several hours, or a major part of one hour, till the desired structure of the body is obtained.

In case, however, difficult shapes of the body are to be produced not obtainable by usual moulds, or in case sharp edges are desired, or angles difficult to manufacture in such a way, so that the mechanical working or finishing of the hard metal body is needed after sintering, then the following ways are preferable.

The pressed and preformed body is to be subjected to sintering temperatures as mentioned before, but such sintering has to be done only for a short period of time, say 1 to 5 to 10 minutes so that the particles are sufficiently fritted together to withstand mechanical treatment without presenting, however, the hardness of a fully sintered body. Such a body is then subjected to finishing in any way and then the sintering at the same temperature is continued until the fully sintered body is achieved.

Another way consists in having admixed to the powders ready for preforming, glycerin, glycol or other alcohols, shaped this mixture and, if desired, pressed and treated at elevated temperature of about 100 to 200° C. but preferably below 180° C., then worked and finished this body of sufficient cohesion whereupon the sintering is possible without any further interruption.

Generally, the body according to my invention is consolidated by using auxiliary metals of the kind and in the amount as mentioned before and treating it at elevated temperature, e. g. in the range up to about 1400 to 1600° C. until the body of desired structure and quality is obtained.

When I refer in the appended claims to carbide of elements selected from the third, fourth, fifth and sixth group of the periodic system, I mean carbides adapted for use in hard tool elements, having a suitable hardness and not being dissolved by water or other liquid employed for cooling or similar purposes at operation temperatures. Such carbides are boron-carbide (belonging to the third group), titanium-carbide, (belonging to the fourth group), vanadium-carbide, columbium-carbide, tantalum-carbide (belonging to the fifth group), and tungsten-carbide, molybdenum-carbide (belonging to the sixth group).

When I refer in the appended claims to formation by heat treatment of solid solutions or homogeneous carbide crystal structures, as defined hereinbefore, in a substantial amount, I mean a minimum amount of about 10% as disclosed in my co-pending applicatioi No. 743,717, filed September 12, 1934, and issued into Patent 2,122,157.

It is quite difficult to mention any minimum amounts of carbide of a selected element to be present. Nevetheless, the minimum amount of carbide to be present and forming part of a solid solution or homogeneous carbide crystal structure, as defined hereinbefore, according to the invention, has to be substantial, and as a minimum about 1% by weight of the alloy.

Tool alloys prepared according to the invention are, as a rule, not used for the production of the entire tool, but merely for the part of the tool which in practice is used directly for cutting, drilling, etc. and which is subject to wear.

From the above description it appears that the carbides to be cemented by auxiliary metal may either be compounded (preformed) into solid solutions or homogeneous carbide crystal structures, as defined hereinbefore, entirely or in substantial amount before a substantial amount of auxiliary metal is added, or the preferably extremely finely powdered carbides may be first mixed with the auxiliary metal and sintered so that the homogeneous carbide crystal structures are formed at least in substantial amount, in the presence of auxiliary metal during sufficiently extended sintering.

What I claim is:

1. A tough cemented hard metal sintered by heat treatment and consisting substantially of auxiliary metal selected essentially from the iron group in amounts from about 3% to 22% and two carbides of different elements other than carbon selected from the third, fourth, fifth and sixth group of the periodic system, said carbides containing together substantially more than 2.6% carbon and being present in finely divided state, said carbides heat treated to form solid solutions in substantial amount.

2. A cemented hard metal composition sintered by heat treatment into a hard and tough body for tool elements and other working appliances, consisting substantially of auxiliary metal selected essentially from the iron group in amounts from about 3% to 22% and carbides of two elements selected from boron, titanium, vanadium, columbium, tantalum, tungsten, said carbides containing together substantially more than 2.6% carbon and being present in finely divided state, said carbides heat treated to form solid solutions in substantial amount.

3. A tough cemented hard metal composition sintered by heat treatment, for tool elements and other working appliances, consisting substantially of auxiliary metal essentially of the iron group, in amounts of about 3% to 22% and hard carbide crystal structures formed by heat treatment from carbon and two different elements other than carbon belonging to different groups of the periodic system and selected from the third to sixth group thereof, substantial amounts of said structures homogeneously containing atoms of said two selected elements in addition to carbon atoms.

4. A tough cemented hard metal composition sintered by heat treatment, for tool elements and other working appliances, consisting substantially of auxiliary metal essentially of the iron group in amounts of about 3% to 22% and hard carbide crystal structures formed by heat treatment from carbon and two elements selected from the group consisting of boron, titanium, vanadium, columbium, tantalum, tungsten, substantial amounts of said structures homogeneously containing atoms of said two selected elements in addition to carbon atoms so as to increase the average hardness of the composition.

5. A tough cemented hard metal composition sintered by heat treatment, for tool elements and other working appliances, consisting substantially of hard carbides of two different elements belonging to different groups of the periodic system and selected from the third, fourth, fifth, and sixth group thereof, and auxiliary metal essentially of the iron group in amounts of about 3% to 22%, the minimum amount of a selected carbide to be 1%, said carbides being heat treated to form in substantial amount, about 10% by weight of the final body as a minimum, homogeneous carbide crystal structures containing atoms of said selected two elements in addition to carbon atoms.

6. A tough cemented hard metal composition sintered by heat treatment, for tool elements and other working appliances, consisting substantially of auxiliary metal essentially of the iron group in amounts from about 3% to about 22%, and hard carbides of two elements selected from the group consisting of titanium, tantalum, columbium, and tungsten, the minimum amount of a selected carbide to be 1%, said carbides heat treated to form in substantial amount homogeneous carbide crystal structures containing atoms of said selected two elements in addition to carbon atoms.

7. A tough cemented hard metal composition sintered by heat treatment, for tool elements and other working appliances, consisting substantially of auxiliary metal essentially of the iron group in amounts of about 3% to 22% and hard carbide crystal structures formed by heat treatment from carbon, titanium and tungsten, substantial amounts of said structures homogeneously containing atoms of titanium and tungsten in addition to carbon atoms.

8. A tough cemented hard metal composition sintered by heat treatment, for tool elements and other working appliances, consisting substantially of hard carbides of two different elements belonging to different groups of the periodic system and selected from the third, fourth, fifth and sixth group thereof, and auxiliary metal essentially of the iron group in amounts of about 3% to 22%, the minimum amount of a selected carbide to be 1%, said carbides being present in finely divided state and heat treated to form in substantial amount homogeneous carbide crystal structures containing atoms of said selected two elements in addition to carbon atoms and to increase the average hardness of the composition.

9. A tough cemented hard metal composition sintered by heat treatment, for tool elements and other working appliances, consisting substantially of hard carbides of two different elements belonging to different groups of the periodic system and selected from the third, fourth, fifth and sixth group thereof, and auxiliary metal essentially of the iron group in amounts of about 3% to 22%, the minimum amount of a selected carbide to be 1%, said carbides being present in as finely divided a state as possible and heat treated to form in substantial amount homogeneous carbide crystal structures containing atoms of said selected two elements in addition to carbon atoms and to increase the average hardness of the composition.

10. A tough cemented hard metal composition sintered by heat treatment, for tool elements and other working appliances, consisting substantially of auxiliary metal essentially of the iron group in amounts of about 3% to 22% and hard carbide crystal structures formed by heat treatment from carbon, titanium and tungsten, substantial amounts of said structures preformed by heat treatment to contain homogeneously atoms of titanium and tungsten in addition to carbon atoms.

11. A tough cemented hard metal composition sintered by heat treatment, for tool elements and other working appliances, consisting substantially of auxiliary metal essentially of the iron group, in amounts of about 3% to 22% and hard carbide crystal structures formed by heat treatment from carbon and two different elements other than carbon belonging to different groups of the periodic system and selected from the third to sixth group thereof, substantial amounts of said structures preformed by heat treatment to contain homogeneously atoms of said two selected elements in addition to carbon atoms.

PAUL SCHWARZKOPF.